United States Patent
Akita et al.

(10) Patent No.: US 7,742,517 B2
(45) Date of Patent: Jun. 22, 2010

(54) METHOD FOR MODULATING A BIT STRING, MODULATOR, RADIO TRANSMITTER, AND RADIO RECEIVER

(75) Inventors: Koji Akita, Kanagawa-ken (JP);
Tomoya Horiguchi, Kanagawa-ken (JP);
Koji Ogura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1105 days.

(21) Appl. No.: 11/360,504

(22) Filed: Feb. 24, 2006

(65) Prior Publication Data

US 2006/0203759 A1    Sep. 14, 2006

(30) Foreign Application Priority Data

Feb. 28, 2005    (JP)    ............... 2005-053704

(51) Int. Cl.
*H04B 1/00*    (2006.01)
(52) U.S. Cl. ................................... 375/146
(58) Field of Classification Search ............... 375/141, 375/144, 146–148, 260; 370/206–208; 332/108
See application file for complete search history.

(56) References Cited

U.S. PATENT DOCUMENTS

| 2006/0104253 A1* | 5/2006 | Douglas et al. ............ 370/338 |
| 2007/0097851 A1* | 5/2007 | Adachi ...................... 370/206 |
| 2009/0015344 A1* | 1/2009 | Lampe et al. ............... 332/108 |
| 2009/0124211 A1* | 5/2009 | Itoh et al. .................... 455/69 |

OTHER PUBLICATIONS

Adachi, F. et al., "Performance of Multicode DS-CDMA Using Frequency Domain Equalisation in Frequency Selective Fading Channel," Electronics Letters, vol. 39, No. 2, 2 pages, (Jan. 23, 2003).

Garg et al., "Chip Interleaving for DS-CDMA with Frequency Domain Equalization in a Frequency Selective Rayleigh Fading Channel," Technical Report of IEICE (2004), pp. 7-12.

* cited by examiner

*Primary Examiner*—Don N Vo
(74) *Attorney, Agent, or Firm*—Finnegan, Henderson, Farabow, Garrett & Dunner, L.L.P.

(57) ABSTRACT

A modulator includes a first input configured to input a first bit string; a first modulating device configured to modulate the inputted first bit string at a first bit rate; a second input configured to input a second bit string; a second modulating device configured to modulate the inputted second bit string at a second bit rate which is lower than the first bit rate; and an output configured to output a modulated signal including the modulated first bit string and the modulated second bit string.

13 Claims, 11 Drawing Sheets

METHOD FOR MODULATING A BIT STRING, MODULATOR, RADIO TRANSMITTER, AND RADIO RECEIVER

CROSS-REFERENCE TO RELATED APPLICATIONS

This application is based upon and claims the benefit of priority from the prior Japanese Patent Application No. 2005-53704, filed Feb. 28, 2005, the entire contents of which are incorporated herein by reference.

BACKGROUND

1. Field of the Invention

One embodiment of the invention relates to a modulator that uses code-division multiplexing, a radio transmitter that uses the modulator, and a radio receiver that receives a signal transmitted from the radio transmitter.

2. Description of the Related Art

It is possible to separate, on a reception side, a signal modulated in the code-division multiplexing into plural user signals and also separate the signal into plural paths. Therefore, a method called Rake combination for performing equalization processing by combining times and phases of separated paths is often used. It is known that, in the Rake combination, since the number of separable paths is limited due to hardware limitation, a reception characteristic is deteriorated when paths exceeding the limited number arrive on the reception side.

On the other hand, there is known a method of transmitting a signal modulated in the code-division multiplexing with a guard interval (GI) added thereto, converting the signal into a signal of frequency domain according to Fast Fourier Transform on a reception side, and performing equalization using the frequency domain. In this method, it is known that, since it is possible to combine paths having delays shorter than the period of the guard interval at a time, the reception characteristic is better than that in the Rake combination when a large number of paths arrive on the reception side (see "Chip Interleaving for DS-CDMA with Frequency Domain Equalization in a frequency selective Rayleigh fading channel", Garg Deepshikha, Fumiyuki Adachi, IEICE Tech. Rep, RCS2003-304, March 2004, p. 7 to 12).

However, the method of performing equalization using the frequency domain has a disadvantage in that overheads are caused by the added guard interval and throughput decreases when no error occurs. Therefore, it is desirable to perform equalization in frequency domain by adding the guard interval to a signal when the number of paths is large and to perform the Rake combination (i.e., equalization in time domain) without adding the guard interval to the signal when the number of paths is small. However, if the guard interval is added to signals for some users and is not added to signals for other users, presence and absence of the GI are mixed among the users. When signals for plural users are multiplexed in a base station apparatus according to the code-division multiplexing, orthogonality of codes is broken, which deteriorates the reception characteristic. Thus, it is necessary to switch presence and absence of the guard interval collectively for all the users. On the other hand, if the guard interval is added to signals for all the users, overheads simply increase for users who receive signals using the Rake combination. As a result, throughput is deteriorated.

SUMMARY OF THE INVENTION

According to an embodiment of the invention, it is to provide a modulator that is adapted to prevent, when receivers that perform Rake combination (equalization in time domain) and receivers that perform equalization in frequency domain are mixed, throughput from being deteriorated even in the former receivers without switching between presence and absence of a guard interval for each of users, a radio transmitter and a radio receiver using the modulator.

In accordance with an aspect of the invention, a method for modulating a bit string and providing a modulated signal comprises: inputting a first bit string; modulating the inputted first bit string at a first bit rate; inputting a second bit string; modulating the inputted second bit string at a second bit rate which is lower than the first bit rate; and outputting the modulated signal including the modulated first bit string and the modulated second bit string.

In accordance with another aspect of the invention, a method for modulating a bit string comprises: inputting a first bit string; modulating the inputted first bit string at a first bit rate; inputting a second bit string; modulating the inputted second bit string at a second bit rate which is lower than the first bit rate; outputting the modulated first bit string and the modulated second bit string as a payload string; adding the modulated first bit string as a guard string to the payload string; and providing a modulated signal including the modulated first bit string and the modulated second bit string as the payload string and the modulated first bit string as the guard string.

In accordance with still another aspect of the invention, a modulator for modulating a bit string and providing a modulated signal comprises: a first input configured to input a first bit string; a first modulating device configured to modulate the inputted first bit string at a first bit rate; a second input configured to input a second bit string; a second modulating device configured to modulate the inputted second bit string at a second bit rate which is lower than the first bit rate; and an output configured to output the modulated signal including the modulated first bit string and the modulated second bit string.

In accordance with still another aspect of the invention, a modulator for modulating a bit string comprises: a first input configured to input a first bit string; a first modulating device configured to modulate the inputted first bit string at a first bit rate; a second input configured to input a second bit string; a second modulating device configured to modulate the inputted second bit string at a second bit rate which is lower than the first bit rate; an output configured to output the modulated first bit string and the modulated second bit string as a payload string; and an adder configured to add the modulated first bit string as a guard string to the payload string and to provide a modulated signal including the modulated first bit string, the modulated second bit string as the payload string and the modulated first bit string as the guard string.

In accordance with still another aspect of the invention, a radio transmitter having a transmitting antenna for transmitting a radio frequency signal to a radio receiver, comprises: a source of a bit string configured to provide a first bit string and a second bit string; a modulator configured to modulate the bit string including a first input configure to input the first bit string, a first modulating device configured to modulate the inputted first bit string at a first bit rate, a second input configured to input the second bit string, a second modulating device configured to modulate the inputted second bit string at a second bit rate which is lower than the first bit rate, an output configured to output the modulated first bit string and the modulated second bit string as a payload string, and an adder configured to add the modulated first bit string as a guard string to the payload string and to provide a modulated signal including the modulated first bit string, the modulated second bit string as the payload string and the modulated first bit string as the guard string; and a radio unit configured to convert the modulated signal into the radio frequency signal and provide the radio frequency signal to the transmitting antenna.

In accordance with still another aspect of the invention, a radio transmitter having a transmitting antenna for transmitting a radio frequency signal to a radio receiver, comprises: a source of a bit string configured to provide a first bit string and a second bit string; a plurality of modulators, wherein each of the modulators including a first input configured to input the first bit string, a first modulating device configured to modulate the inputted first bit string at a first bit rate, a second input configure to input the second bit string, a second modulating device configured to modulate the inputted second bit string at a second bit rate which is lower than the first bit rate, an output configured to output the modulated first bit string and the modulated second bit string as a payload string, and an adder configured to add the modulated first bit string as a guard string to the payload string and to provide a modulated signal including the modulated first bit string, the modulated second bit string as the payload string and the modulated first bit string as the guard string; modulated signal combining unit configured to combine the modulated signals outputted from the plurality of modulators; and a radio unit-configured to convert the modulated signals into the radio frequency signal and provide the radio frequency signal to the transmitting antenna.

In accordance with still another aspect of the invention, a radio receiver comprises: a reception antenna configured to receive radio frequency signal; a radio unit coupled to the reception antenna and configured to convert the received radio frequency signal into a modulated signal being modulated at a modulator, wherein the modulated signal including a modulated first bit string modulated at a first bit rate, the modulated second bit string modulated at a second bit rate which is lower than the first bit rate, and the modulated first bit string as a guard string; a combiner configured to combine the modulated first bit string as a payload string and the modulated first bit string as the guard string; and a first demodulating device configured to demodulate the modulated signal corresponding to the modulated first bit string as the payload string and the modulated first bit string as the guard string at the first bit rate; and a second demodulating device configured to demodulate the modulated signal corresponding to the modulated second bit string at the second bit rate.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 2:
FIG. 2 is an exemplary diagram showing a guard interval, a frame, and symbols.

An embodiment of the invention will be hereinafter explained with reference to the accompanying drawings. First, terms will be explained with reference to FIG. 2.

A "symbol" is a unit for performing modulation. One symbol includes plural pieces of information bits. It is possible to change a bit rate of modulation by changing the number of bits per one symbol or changing length of the symbol. A "frame" is a set of plural symbols. A guard interval is added for each frame. In an example in FIG. 2, the frame includes eight symbols (d1 to d8). The first and the second symbols are copied and added as the guard interval. Other types of guard intervals, however, may also be used.

Figure 1:
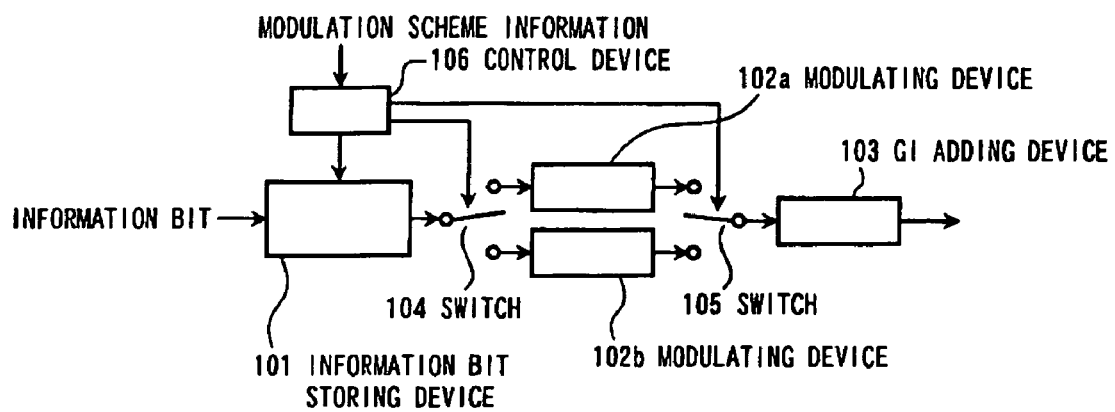
FIG. 1 is an exemplary diagram showing a modulator according to an embodiment of the invention.

An example of a constitution of a modulator according to the embodiment of the invention is shown in FIG. 1.

A modulator 100 includes an information bit storing device 101 in which information bits indicating information to be transmitted are inputted and temporarily stored, modulating devices 102a and 102b that modulate the information bits outputted from the information bit storing device 101, a GI adding device 103 that adds a guard interval to the information bits modulated, a switch 104 that switches an output from the information bit storing device 101 to supply the information bits to the modulating device 102a or the modulating device 102b, a switch 105 that supplies an output of the modulating device 102a or an output of the modulating device 102b to the GI adding device 103, and a control device 106 that controls the information bit storing device 101, the switch 104, and the switch 105.

Operations of the devices will be explained below.

An information bit string, for example, a frame, including plural information bits is temporarily stored in the information bit storing device 101.

Modulation scheme information is stored in the control device 106. The modulation scheme information is information that indicates one of modulation schemes according to which modulation is performed. The modulation schemes include a "scheme 1" for modulating all symbols in the information bit string using the modulating device 102a and a "scheme 2" for modulating symbols corresponding to a guard interval (a guard symbol or symbols) using the modulating device 102b and modulating remaining symbols not corresponding to the guard interval (an useful symbol or symbols) using the modulating device 102a. The symbols corresponding to a guard interval may be referred to as a guard string, and the remaining symbols not corresponding to the guard interval may also be referred to as a payload string.

When information indicating the "scheme 1" is inputted as the modulation scheme information, the control device 106 outputs a control signal to connect the switch 104 and the switch 105 to the modulating device 102*a* side, that is, to control the switch 104 and the switch 105 to couple the modulating device 102*a* to the information bit storing device 101 and the GI adding device 103, respectively. The control device 106 controls the information bit storing device 101 to output an information bit string according to a bit rate modulated by the modulating device 102*a*. The information bit string outputted from the information bit storing device 101 (shown in (a) in FIG. 3) is inputted to the modulating device 102*a* to perform modulation.

The modulating device 102*a* subjects the information bit string to a primary modulation and further subjects the information bit string to a secondary modulation by code spreading. A modulated signal (shown in (b) in FIG. 3) is inputted to the GI adding device 103. When a signal equivalent to a frame length is inputted, the GI adding device 103 copies a part of the signal equivalent to a length of a guard interval from the top of, the frame and adds the copied signal to the end of the frame. A signal added with the guard interval in this way (shown in (c) in FIG. 3) is outputted from the modulator. Modulation performed in this way is the same as usual modulation for adding a guard interval.

On the other hand, when information indicating the "scheme 2" is inputted as the modulation scheme information, first, the control device 106 connects the switch 104 and the switch 105 to the modulating device 102*b* side, that is, to control the switch 104 and the switch 105 to couple the modulating device 102*b* to the information bit storing device 101 and the GI adding device 103, respectively. The control device 106 controls the information bit storing device 101 to output an information bit string according to a bit rate modulated by the modulating device 102*b*.

Figure 4:
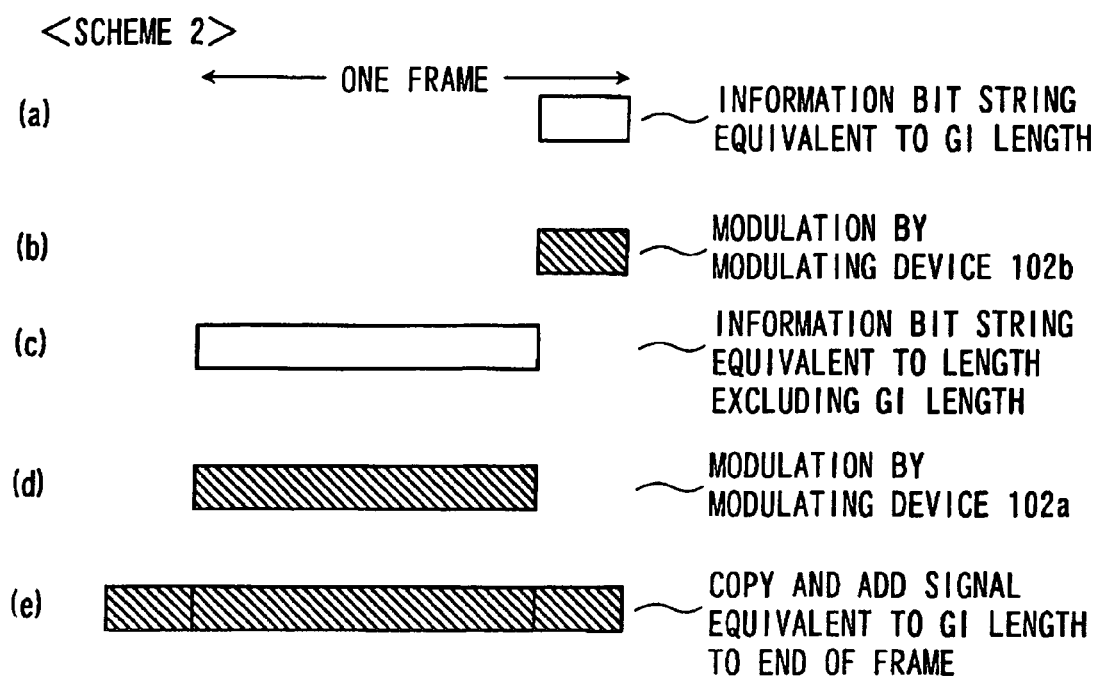
FIG. 4 is an exemplary diagram showing operations of a scheme 2 in the embodiment.

Thereafter, at a stage when an information bit string equivalent to a guard interval length in the modulating device 102*b* (shown in (a) in FIG. 4) is outputted from the information bit storing device 101, the control device 106 switches the switch 104 to the modulating device 102*a* side. At a stage when a modulated signal equivalent to the guard interval length (shown in (b) in FIG. 4) is outputted from the modulating device 102*b*, the control device 106 switches the switch 105 to the modulating device 102*a* side.

Similarly, at a stage when an information bit string equivalent to a length obtained by excluding the GI length from the frame length in the modulating device 102*a* (shown in (c) in FIG. 4) is outputted from the information bit storing device 101, the control device 106 switches the switch 104 to the modulating device 102*b* side. At a stage when a modulated signal equivalent to the frame length (shown in (d) in FIG. 4) are outputted from the modulating device 102*a*, the control device 106 switches the switch 105 to the modulating device 102*b* side. The control device 106 repeats these operations as time passes.

When the signal equivalent to the frame length is inputted, the GI adding device 103 copies a part of the signal equivalent to the GI length from the top of the frame and adds the copied signal to the end of the frame. A signal added with the guard interval in this way (shown in (e) in FIG. 4) is outputted from the modulator.

In a similar manner to the modulating device 102*a*, the modulating device 102*b* subjects an information bit string to a primary-modulation and further subjects the information bit string to a secondary modulation by code spreading. The modulation bit rate in the modulating device 102*b* is set higher than the modulation bit rate in the modulating device 102*a*. In this way, it is possible to reduce or eliminate deterioration in throughput due to addition of the guard interval. It is possible to subject a signal formed in this way and the signal demodulated in the "scheme 1" to code-division multiplexing.

When the "scheme 1" is selected, equalization in a frequency domain is performed on a reception side. On the other hand, when the "scheme 2" is selected, Rake combination (equalization in a time domain) is performed on the reception side. The modulator switches the modulation scheme by grasping in advance in which of the schemes an apparatus communicating with the modulator performs equalization. The modulator only has to grasp in which of the schemes the apparatus communicating with the modulator performs equalization, for example, when the modulator establishes a communication channel with the apparatus first.

Figure 3:
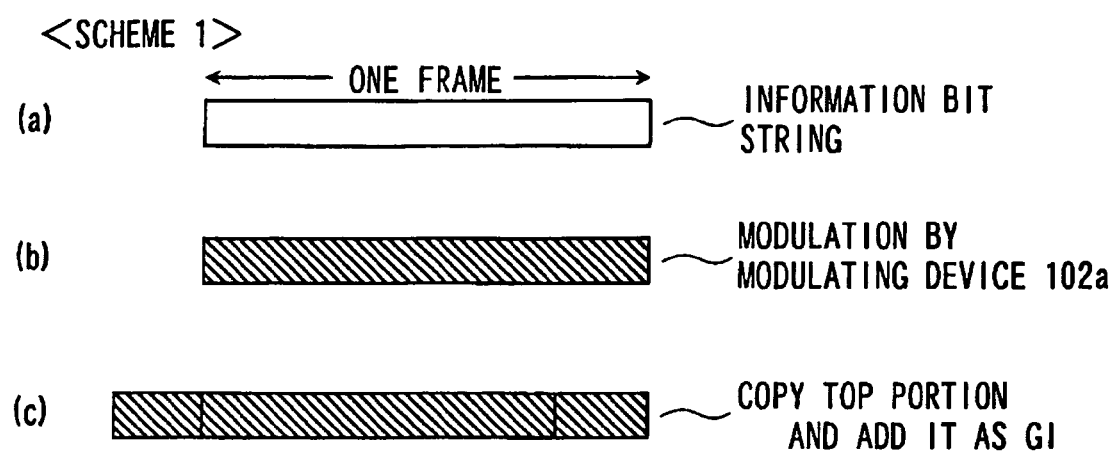
FIG. 3 is an exemplary diagram showing operations of a scheme 1 in the embodiment.

According to the invention, the modulated signal according to the scheme 1 ((c) in FIG. 3) and the modulated signal according to the scheme 2 ((e) in FIG. 4) are in a relation in which, if spreading code method is selected to make the signals before addition of the guard interval orthogonal to each other, the signals after addition of the guard interval are also orthogonal to each other. When spreading codes are orthogonal to each other, this means that a correlation value of codes is 0 or a relatively small value. A correlation value of the code A and the code B represents a value obtained by multiplying complex conjugates of the code A and the code B for a length corresponding to a spreading ratio and adding results of the multiplication.

As described above, since the spreading codes are selected to be orthogonal to each other on the transmission side, it is possible to separate the modulated signal ((c) in FIG. 3) according to the scheme 1 and the modulated signal ((e) in FIG. 4) according to the scheme 2 on the reception side. A receiver that performs equalization in a frequency domain can demodulate only the modulated signal according to the scheme 1 ((c) in FIG. 3). A receiver that performs Rake combination (equalization in a time domain) can demodulate only the modulated signal according to the scheme 2 ((e) in FIG. 4). In other words, orthogonality of codes is not broken even if the guard interval is added and transmitted.

When the modulation bit rate in the modulating device 102*b* is set to be twice as high as the modulation bit rate in the modulating device 102*a*, it is possible to realize the same throughput as throughput without overhead of the guard interval. A reason for this is explained as follows with reference to FIG. 2.

When information of 1 bit is embedded in all the symbols without adding the guard interval, it is possible to transmit information of 10 bits using ten symbols based on an original modulation bit rate. On the other hand, when the guard interval is added without changing the original bit rate since no information is included in the guard interval, it is possible to transmit only information of 8 bits using ten symbols. However, when the symbols corresponding to the guard interval (e.g., symbols d1 and d2 in the frame, etc.) are modulated at a bit rate twice as high as the original bit rate, information of 2 bits is embedded in the symbols of d1 and d2, respectively, in the example in FIG. 2. Thus, information of 10 bits in total, that is, 4 bits (2×2) in d1 and d2 and 6 bits (1×6) in d3 to d8, is transmitted. It is possible to transmit the same amount of information no matter whether the guard interval is added or not.

Figure 5:
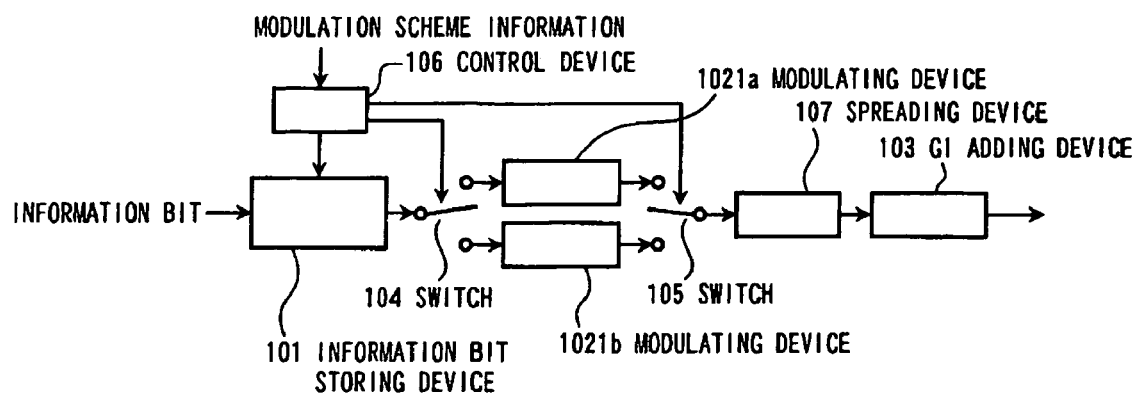
FIG. 5 is a diagram showing a modification of the embodiment.

A modification of the embodiment will be explained with reference to FIG. 5. Components identical with those in FIG. 1 are denoted by the identical reference numerals and signs and detailed explanations of the components are omitted. A code spreading unit ("spreading device 107" in FIG. 5) that performs secondary modulation in a modulating device 1021a and a modulating device 1021b in the constitution shown in FIG. 1 is common to both the modulating devices. One code spreading unit is provided immediately before the GI adding device 103. Consequently, since only one spreading device has to be provided, it is possible to simplify the constitution of the modulator.

Figure 6:
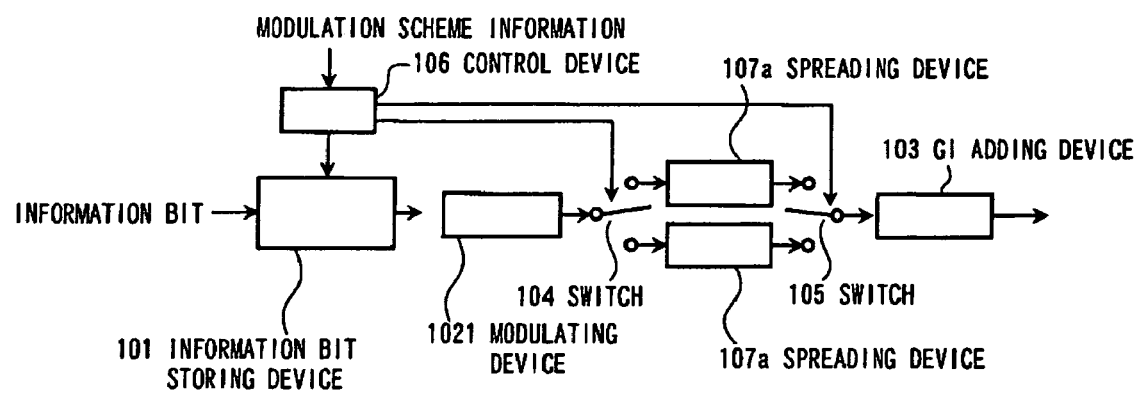
FIG. 6 is a diagram showing another modification of the embodiment.

Another modification of the embodiment will be explained with reference to FIG. 6. Components identical with those in FIG. 1 are denoted by the identical reference numerals and signs and detailed explanations of the components are omitted. Primary modulation in the modulating device 102a and the modulating device 102b in the constitution shown in FIG. 1 is performed by one modulating device ("modulating device 1021" in FIG. 6) and the code spreading unit that performs secondary modulation is divided into a first device for the "scheme 1" ("spreading device 107a") and a second device for the "scheme 2" ("spreading device 107b") In that case, the spreading ratio of the spreading device 107b for the "scheme 2" is set larger than the spreading ratio of the spreading device 107a for the "scheme 1" such that the same amount of information is transmitted with or without the guard interval being added. This is equivalent to the constitution in which the modulation bit rate in the modulating device 102b is set higher than the modulation bit rate in the modulating device 102a in FIG. 1. Since only one modulating device for primary modulation is provided, it is possible to simplify the constitution of the modulator.

Figure 7:
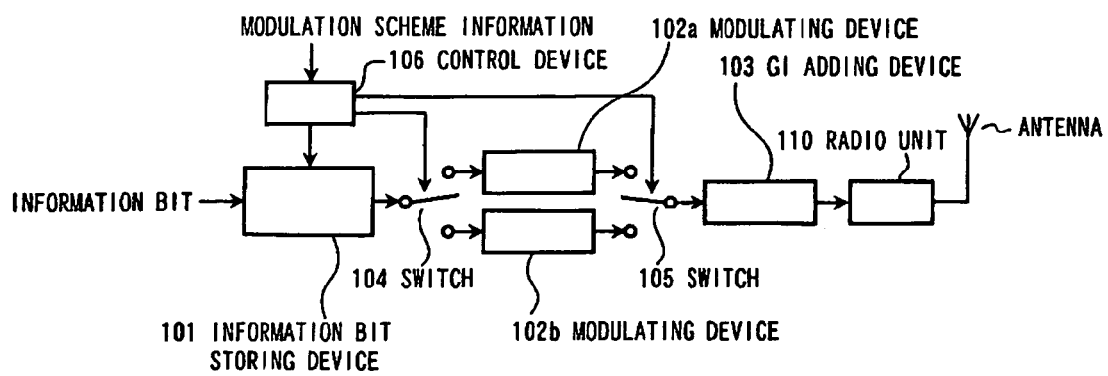
FIG. 7 is a diagram showing an example of a radio communication apparatus according to the embodiment.

FIG. 7 is a diagram of an example in which the modulator shown in FIG. 1 is applied to a radio (a radio transmitter) A signal modulated by the modulator explained in the embodiment is converted into a high-frequency radio signal by a radio unit 110. The radio signal is transmitted as a radio wave by an antenna.

Figure 8:
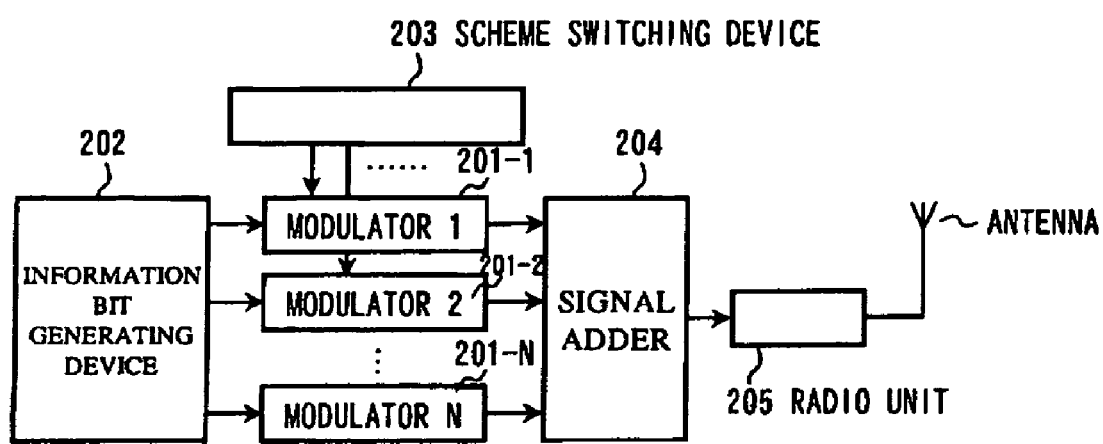
FIG. 8 is a diagram showing an example in which the radio communication apparatus is applied to a radio base station.

FIG. 8 is a diagram showing an example in which the modulator shown in FIG. 1 is applied to a radio base station apparatus of a radio LAN or a cellular phone network. A radio base station apparatus 200 includes plural modulators (201-1 to 201-N: N is a natural number), which correspond to users of radio units (e.g., nodes of the radio LAN, cellular phones, etc.) communicating with the radio base station apparatus 200, respectively. An information bit generating device 202 generates an information bit string for each of the users to whom information is transmitted and inputs the information bit string to the modulator corresponding to the user. A scheme switching device 203 selects a scheme suitable for each of the users to whom information is transmitted (i.e., selection of the "scheme 1" and the "scheme 2") and inputs modulation scheme information to the modulator (201-1 to 201-N) corresponding to the user.

Each of the modulators generates a signal obtained by modulating the inputted information bit string using the scheme selected by the scheme switching device 203 and outputs the generated signal to an adder 204. At this point, boundaries of frames of signals outputted from the respective modulators are synchronized. The adder 204 adds up all the signals inputted to generate an added-up signal and outputs the added-up signal to a radio unit 205. The radio unit 205 converts the inputted signal into a radio signal and transmits the radio signal as a radio wave by an antenna.

The scheme switching device 203 may select a scheme in accordance with requests from the users. Consequently, since it is possible to change a scheme in accordance with states or requests of the users, it is possible to perform appropriate communication with each of the users.

Figure 9:
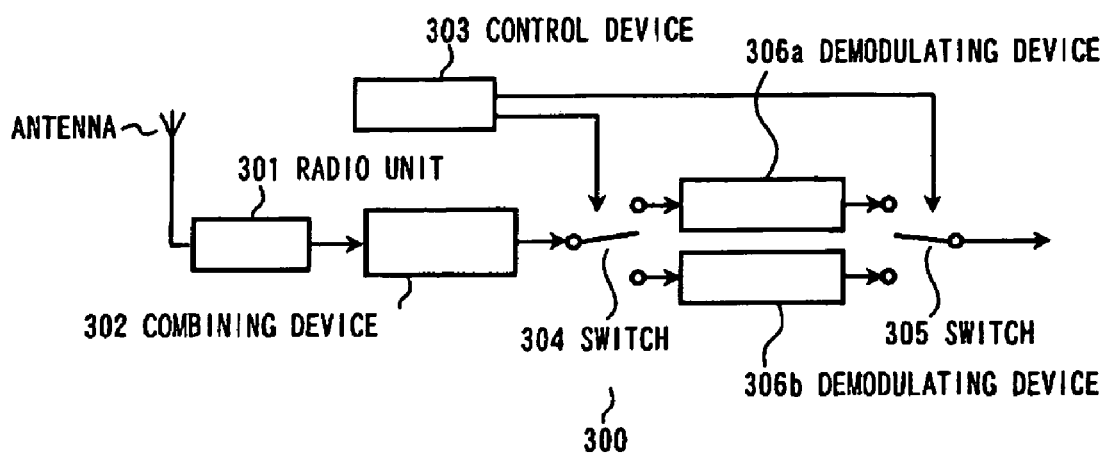
FIG. 9 is a diagram showing an example of a radio receiver according to the embodiment.

FIG. 9 is a diagram showing an example of a constitution of a radio receiver according to the embodiment of the invention. A radio receiver 300 in FIG. 9 performs a procedure opposite to the procedure of the radio transmitter shown in FIG. 7.

Figure 10:
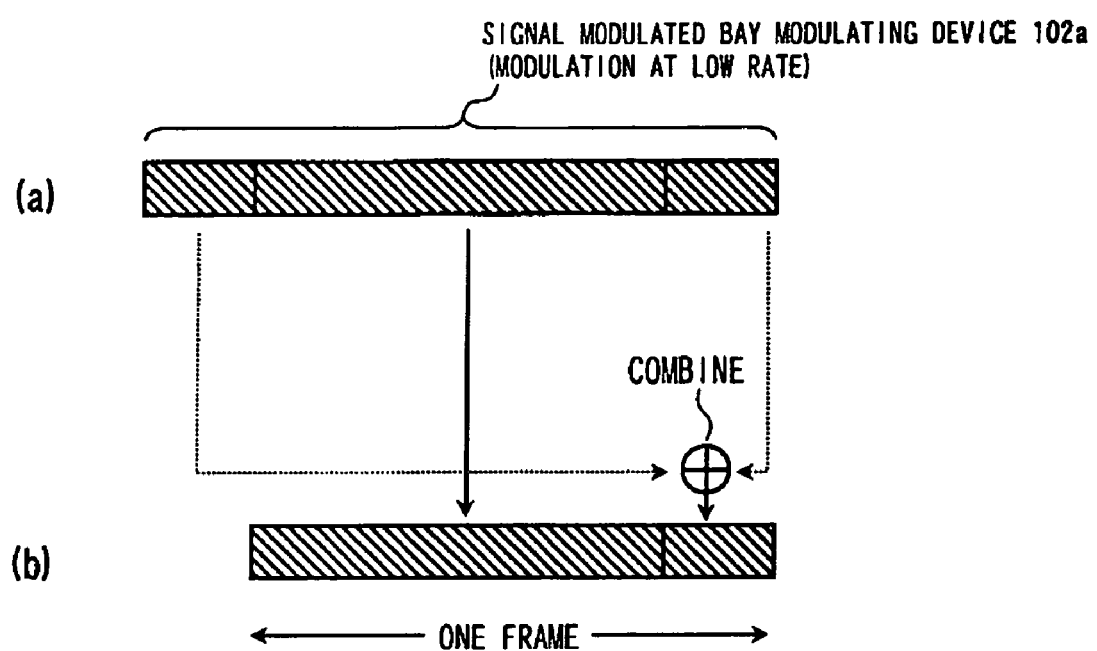
FIG. 10 is a diagram showing an exemplary operation of the radio receiver.
Figure 11:
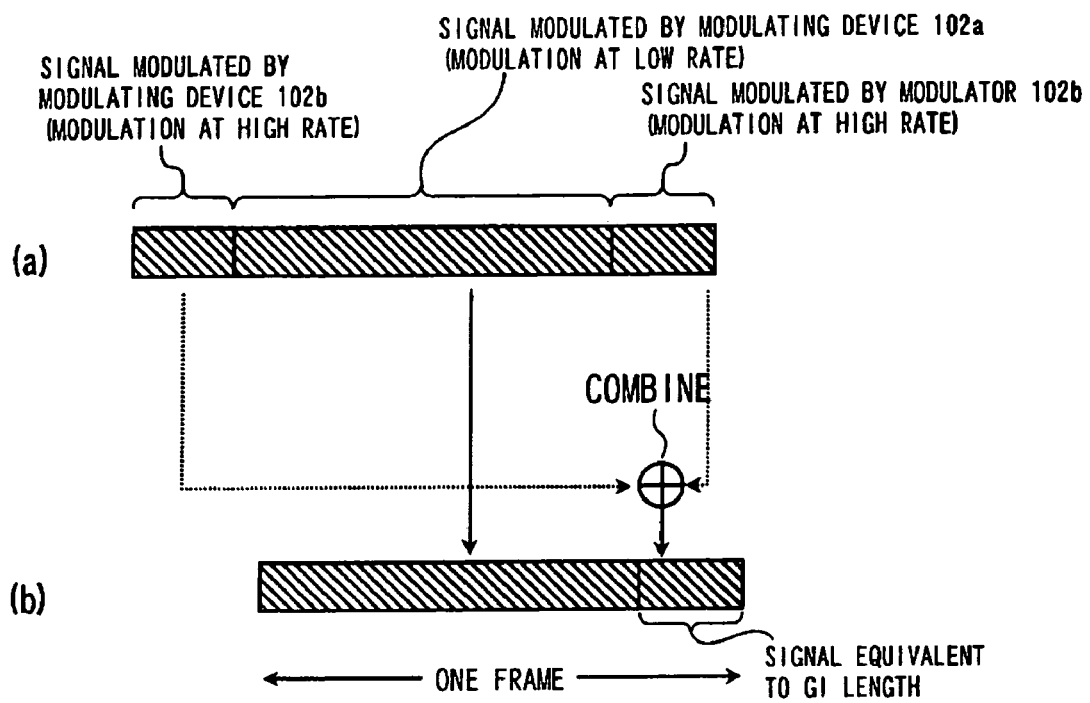
FIG. 11 is a diagram showing another exemplary operation of the radio receiver.

A signal inputted from an antenna is converted into a base band digital signal by a radio unit 301. A combining device 302 combines a guard interval and the top of a frame. FIGS. 10 and 11 are diagrams showing exemplary combination operations.

In FIG. 10, a signal modulated by the "scheme 1" is inputted. In FIG. 11, a signal modulated by the "scheme 2" is inputted. In the signals modulated shown in (a) in FIG. 10 and (a). in FIG. 11, a guard interval and the top of a frame are combined by the combining device 302. Since the guard interval is obtained by copying and adding the top of the frame to the end of the frame, a Signal to Noise Ratio (SNR) is improved by combining the guard interval and the top of the frame. Signals with the guard interval combined (shown in (b) in FIG. 10 and (b) in FIG. 11) are inputted to a demodulating device. In this case, since operations of switches are different depending on schemes, a control device 303 controls the schemes. The operations of the switches will be explained below for each of the schemes.

In the case of the "scheme 1", both a switch 304 and a switch 305 are always connected to a demodulating device 306a side, that is, the switch 304 and the switch 305 are controlled to couple the demodulating device 306a to the combining device 302 and the output of the radio receiver, respectively.

On the other hand, when the "scheme 2" is selected, first, the control device 303 connects the switch 304 and the switch 305 to a demodulating device 306b side, that is, the switch 304 and the switch 305 are controlled to couple the demodulating device 306b to the combining device 302 and the output of the radio receiver, respectively. Thereafter, at a stage when a signal equivalent to a guard interval length ("signal equivalent to a GI length" in (b) in FIG. 11) is inputted to the demodulating device 306b, the control device 303 switches the switch 304 to the demodulating device 306a side. At a stage when a modulated signal equivalent to the guard interval length is outputted from the demodulating device 306b, the control device 303 switches the switch 305 to the demodulating device 306a side.

Similarly, at a stage when a signal equivalent to a length obtained by excluding the GI length from a frame length is inputted to the demodulating device 306a, the control device 303 switches the switch 304 to the demodulator 306b side. At a stage when demodulated signals equivalent to the frame length is outputted from the demodulating devices 306a and 306b, the control device 303 switches the switch 305 to the demodulating device 306b side. The control device 303 repeats these operations as time passes.

In the "scheme. 2", a bit rate of symbols ("signal equivalent to a GI length" in (b) in FIG. 11) corresponding to the guard interval is higher than that in the "scheme 1". Since the bit rate is higher, an SNR for attaining the same error ratio is also high. Thus, it is possible to improve the SNR of the symbols corresponding to the guard interval in the manner described above, and throughput is not deteriorated even in the receiver that performs Rake combination.

According to the invention, throughput is not deteriorated in the receiver that performs Rake combination without switching presence and absence of a guard interval for each of users.

The embodiment of the invention has been explained in detail. However, the invention is not limited only to the embodiment or any disclosed modifications of the embodiment. At a stage when the invention is carried out, the invention may be embodied by modifying the component in a range without departing from the spirit of the invention. It is possible to form various inventions according to appropriate combinations of the plural components disclosed in the embodiment. For example, several components may be deleted from all the components described in the embodiment. Moreover, components described in different embodiments may be appropriately combined.

What is claimed is:

1. A method used by a modulator for modulating a bit string, comprising:
   inputting a first bit string;
   modulating the inputted first bit string at a first bit rate;
   inputting a second bit string;
   modulating the inputted second bit string at a second bit rate which is lower than the first bit rate;
   outputting the modulated first bit string and the modulated second bit string together as a payload string;
   adding the modulated first bit string as a guard string to the payload string; and
   providing a modulated signal including the modulated first bit string and the modulated second bit string as the payload string and the modulated first bit string as the guard string.

2. The method according to claim 1, wherein the first bit rate is twice as high as the second bit rate.

3. The method according to claim 1, wherein the first bit string and the second bit string are modulated by code spreading.

4. A modulator for modulating a bit string and providing a modulated signal, comprising:
   a first input configured to input a first bit string;
   a first modulating device configured to modulate the inputted first bit string at a first bit rate;
   a second input configured to input a second bit string;
   a second modulating device configured to modulate the inputted second bit string at a second bit rate which is lower than the first bit rate; and
   an output configured to output the modulated signal including the modulated first bit string and the modulated second bit string, wherein the modulated first bit string acts as a guard string.

5. The modulator according to claim 4, wherein the first bit string and the second bit string are modulated by code spreading.

6. A modulator for modulating a bit string, comprising:
   a first input configured to input a first bit string;
   a first modulating device configured to modulate the inputted first bit string at a first bit rate;
   a second input configured to input a second bit string;
   a second modulating device configured to modulate the inputted second bit string at a second bit rate which is lower than the first bit rate;
   an output configured to output the modulated first bit string and the modulated second bit string together as a payload string; and
   an adder configured to add the modulated first bit string as a guard string to the payload string and to provide a modulated signal including the modulated first bit string and the modulated second bit string as the payload string, and the modulated first bit string as the guard string.

7. The modulator according to claim 6, wherein the first bit rate is twice as high as the second bit rate.

8. A radio transmitter having a transmitting antenna for transmitting a radio frequency signal to a radio receiver, comprising:
   a source of a bit string configured to provide a first bit string and a second bit string;
   a modulator configured to modulate the bit string including
     a first input configured to input the first bit string;
     a first modulating device configured to modulate the inputted first bit string at a first bit rate;
     a second input configured to input the second bit string;
     a second modulating device configured to modulate the inputted second bit string at a second bit rate which is lower than the first bit rate;
     an output configured to output the modulated first bit string and the modulated second bit string together as a payload string; and
     an adder configured to add the modulated first bit string as a guard string to the payload string and to provide a modulated signal including the modulated first bit string and the modulated second bit string as the payload string, and the modulated first bit string as the guard string; and
   a radio unit configured to convert the modulated signal into the radio frequency signal and provide the radio frequency signal to the transmitting antenna.

9. A radio transmitter having a transmitting antenna for transmitting a radio frequency signal to a radio receiver, comprising:
   a source of a bit string configured to provide a first bit string and a second bit string;
   a plurality of modulators, wherein each of the modulators includes
     a first input configured to input the first bit string;
     a first modulating device configured to modulate the inputted first bit string at a first bit rate;
     a second input configured to input the second bit string;
     a second modulating device configured to modulate the inputted second bit string at a second bit rate which is lower than the first bit rate;
     an output configured to output the modulated first bit string and the modulated second bit string together as a payload string; and
     an adder configured to add the modulated first bit string as a guard string to the payload string and to provide a modulated signal including the modulated first bit string and the modulated second bit string as the payload string, and the modulated first bit string as the guard string;
   a modulated signal combining unit configured to combine the modulated signals outputted from the plurality of modulators; and
   a radio unit configured to convert the modulated signals into the radio frequency signal and provide the radio frequency signal to the transmitting antenna.

10. A radio receiver, comprising:
    a reception antenna configured to receive a radio frequency signal;
    a radio unit, coupled to the reception antenna, configured to convert the received radio frequency signal into a modulated signal being modulated at a modulator, wherein the modulated signal including a modulated first bit string modulated at a first bit rate, the modulated second bit string modulated at a second bit rate which is lower than the first bit rate, and the modulated first bit string as a guard string;

a combiner configured to combine the modulated first bit string as a payload string and the modulated first bit string as the guard string; and a first demodulating device configured to demodulate the modulated signal corresponding to the modulated first bit string as the payload string and the modulated first bit string as the guard string at the first bit rate; and a second demodulating device configured to demodulate the modulated signal corresponding to the modulated second bit string as the payload string at the second bit rate.

11. A modulator for modulating a bit string, comprising:

a first input configured to input a first bit string;

a first modulating device configured to modulate the inputted first bit string at a first bit rate;

a second input configured to input a second bit string;

a second modulating device configured to modulate the inputted second bit string at a second bit rate which is lower than the first bit rate;

a control device configured to select a modulation scheme as one of a first modulation scheme and a second modulation scheme;

an output configured to output a modulated bit string as a payload string; and an adding device configured to add a guard string to the payload string and to provide both the payload string and the guard string for further processing, wherein if the control device selects the first modulation scheme, the output outputs the modulated first bit string and the modulated second bit string together as the payload string; and the adding device adds the modulated first bit string as the guard string to the payload string.

12. The modulator according to claim 11, wherein the first modulating device is configured to modulate the inputted first bit string at the first bit rate if the selected modulation scheme is the first modulation scheme, and not to modulate either of the first bit string and the second bit string if the selected modulation scheme is the second modulation scheme; and the second modulating device is configured to modulate the inputted second bit string at the second bit rate if the selected modulation scheme is the first modulation scheme, and to modulate both the first bit string and the second bit string at the second bit rate if the selected modulation scheme is the second modulation scheme.

13. The modulator according to claim 12, wherein:

the output is configured to output the modulated signal based on the modulated first bit string and modulated second bit string from the second modulating device if the selected modulation scheme is the second modulation scheme.

* * * * *